(12) United States Patent
Van Erp

(10) Patent No.: US 12,063,942 B2
(45) Date of Patent: *Aug. 20, 2024

(54) APPARATUS AND METHOD TO TREAT DAIRY PRODUCTS

(71) Applicant: GEA FOOD SOLUTIONS BAKEL B.V., Bakel (NL)

(72) Inventor: Joost Van Erp, Nuenen (NL)

(73) Assignee: GEA Mechanical Equipment GMBH, Oelde (DE)

( * ) Notice: Subject to any disclaimer, the term of this patent is extended or adjusted under 35 U.S.C. 154(b) by 930 days.

This patent is subject to a terminal disclaimer.

(21) Appl. No.: 16/609,518

(22) PCT Filed: May 9, 2018

(86) PCT No.: PCT/EP2018/062001
§ 371 (c)(1),
(2) Date: Oct. 30, 2019

(87) PCT Pub. No.: WO2018/206641
PCT Pub. Date: Nov. 15, 2018

(65) Prior Publication Data
US 2020/0060301 A1     Feb. 27, 2020

(30) Foreign Application Priority Data

May 9, 2017   (EP) ...................................... 17170103
Mar. 1, 2018  (EP) ...................................... 18159562

(51) Int. Cl.
*A23C 3/07*      (2006.01)
*A23L 3/005*     (2006.01)
(Continued)

(52) U.S. Cl.
CPC ................ *A23C 3/07* (2013.01); *A23L 3/005* (2013.01); *A23L 3/16* (2013.01); *A23L 5/30* (2016.08);
(Continued)

(58) Field of Classification Search
None
See application file for complete search history.

(56) References Cited

U.S. PATENT DOCUMENTS 4,457,220 A   7/1984   Entremont et al.
5,253,567 A   10/1993  Gunawardena
(Continued)

FOREIGN PATENT DOCUMENTS

CN   102986756 A   3/2013
CN   105698228 A   6/2016
(Continued)

OTHER PUBLICATIONS

International Search Report and Written Opinion for International Application No. PCT/EP2018/062001, dated Jul. 3, 2018.
(Continued)

*Primary Examiner* — Erik Kashnikow
*Assistant Examiner* — Lela S. Davis
(74) *Attorney, Agent, or Firm* — The Dobrusin Law Firm, P.C.

(57) ABSTRACT

A processing apparatus that includes: a pump; a microwave chamber; and at least one solid-state radio frequency source. The pump pumps a diary product through the microwave chamber; the solid-state radio frequency source includes one or more antennas and/or waveguides; the processing apparatus has a sensor and a control system, the sensor is configured to measure at least one property of the dairy product and at least one property of radiation reflected from the diary product, and a signal from the sensor is utilized by (Continued)

the control system to control the solid-state radio frequency source; a chamber is arranged between the microwave chamber and the solid-state radio frequency source so that the solid-state radio frequency source is free from contacting a wall of the microwave chamber, the chamber is cooled by a cooling unit that is configured to cool the radio frequency source.

20 Claims, 2 Drawing Sheets

(51) Int. Cl.
| | | |
|---|---|---|
| | *A23L 3/16* | (2006.01) |
| | *A23L 3/18* | (2006.01) |
| | *A23L 5/30* | (2016.01) |
| | *H05B 6/64* | (2006.01) |
| | *H05B 6/68* | (2006.01) |
| | *H05B 6/78* | (2006.01) |

(52) U.S. Cl.
CPC .............. *A23L 5/34* (2016.08); *H05B 6/6447* (2013.01); *H05B 6/686* (2013.01); *H05B 6/782* (2013.01); *A23L 3/18* (2013.01)

(56) References Cited

U.S. PATENT DOCUMENTS

| | | |
|---|---|---|
| 6,246,040 B1 | 6/2001 | Gunn |
| 9,265,097 B2 * | 2/2016 | Torres .................... H05B 6/705 |
| 2006/0006172 A1 | 1/2006 | Sedlmayr |
| 2011/0033584 A1 | 2/2011 | Bilchinsky et al. |
| 2011/0159103 A1 | 6/2011 | Akashe et al. |
| 2012/0103975 A1 | 5/2012 | Okajima |
| 2015/0271877 A1 | 9/2015 | Johansson |
| 2015/0313273 A1 * | 11/2015 | Stromotich .............. A23B 4/01 34/259 |
| 2016/0278170 A1 | 9/2016 | Atherton et al. |
| 2016/0324195 A1 | 11/2016 | Simunovic et al. |

FOREIGN PATENT DOCUMENTS

| | | |
|---|---|---|
| EP | 2322883 A1 | 5/2011 |
| FR | 2264494 A1 | 10/1975 |
| GB | 2098040 A | 11/1982 |
| JP | H07255388 A | 10/1995 |
| RO | 125073 B1 | 9/2010 |
| WO | 2009/116923 A1 | 9/2009 |
| WO | 2014/147651 A1 | 9/2014 |
| WO | 2016/100539 A1 | 6/2016 |

OTHER PUBLICATIONS

International Preliminary Report on Patentability for International Application No. PCT/EP2018/062001, dated Sep. 6, 2019.
Yadav Deep et al—Microwave technology for disinfestation of cereals and pulses, pp. 3568-3576, dated Dec. 16, 2012.
XP002781829—Database WPI, Week 201349, DB accession n° 2013-K85640; & CN 102 986 756 A, Mar. 27, 2013.

* cited by examiner

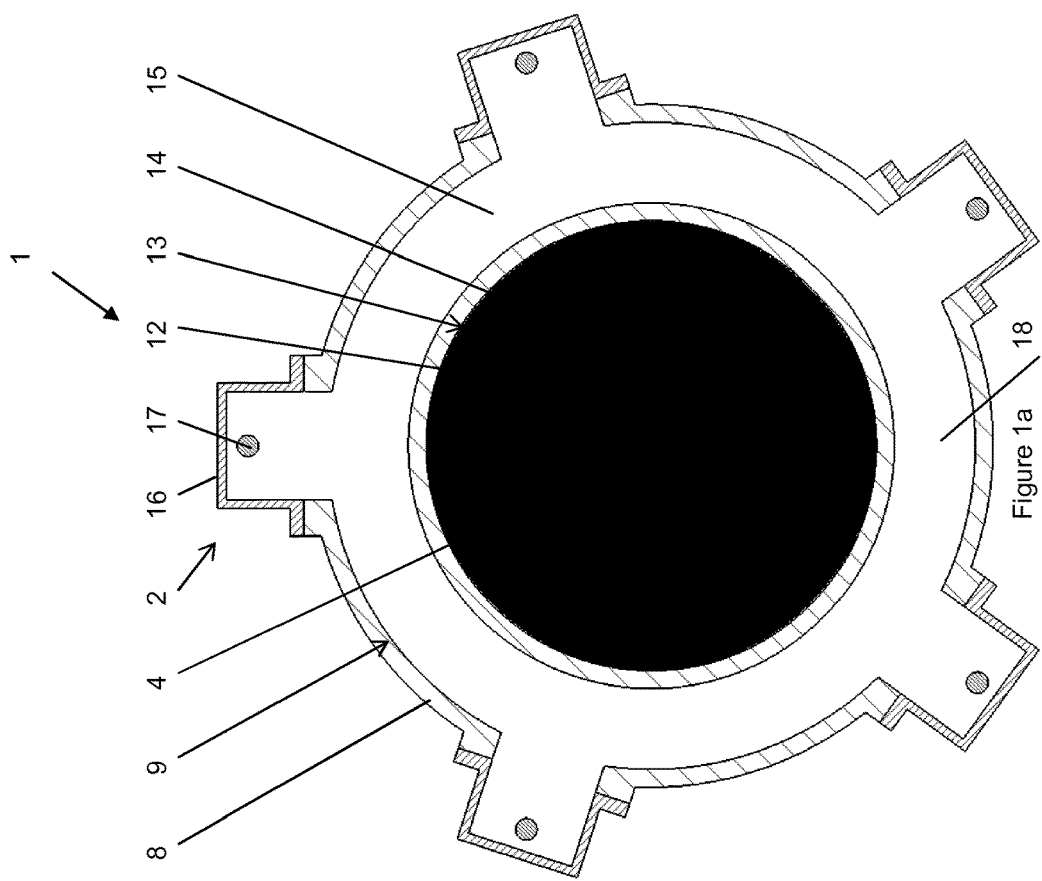
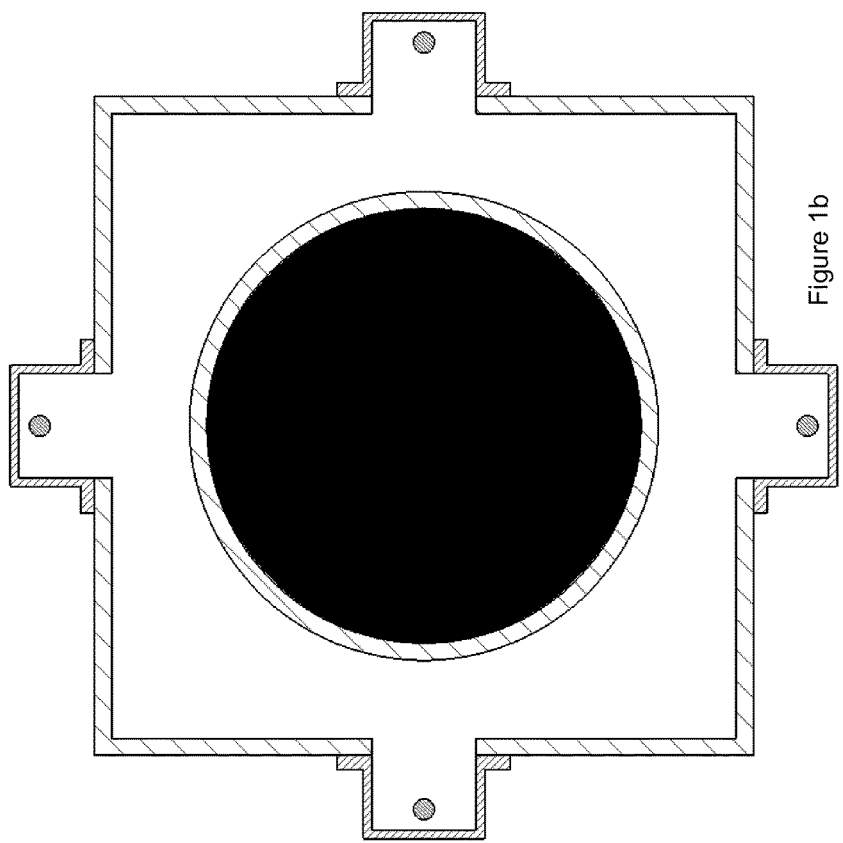
Figure 1a
Figure 1b

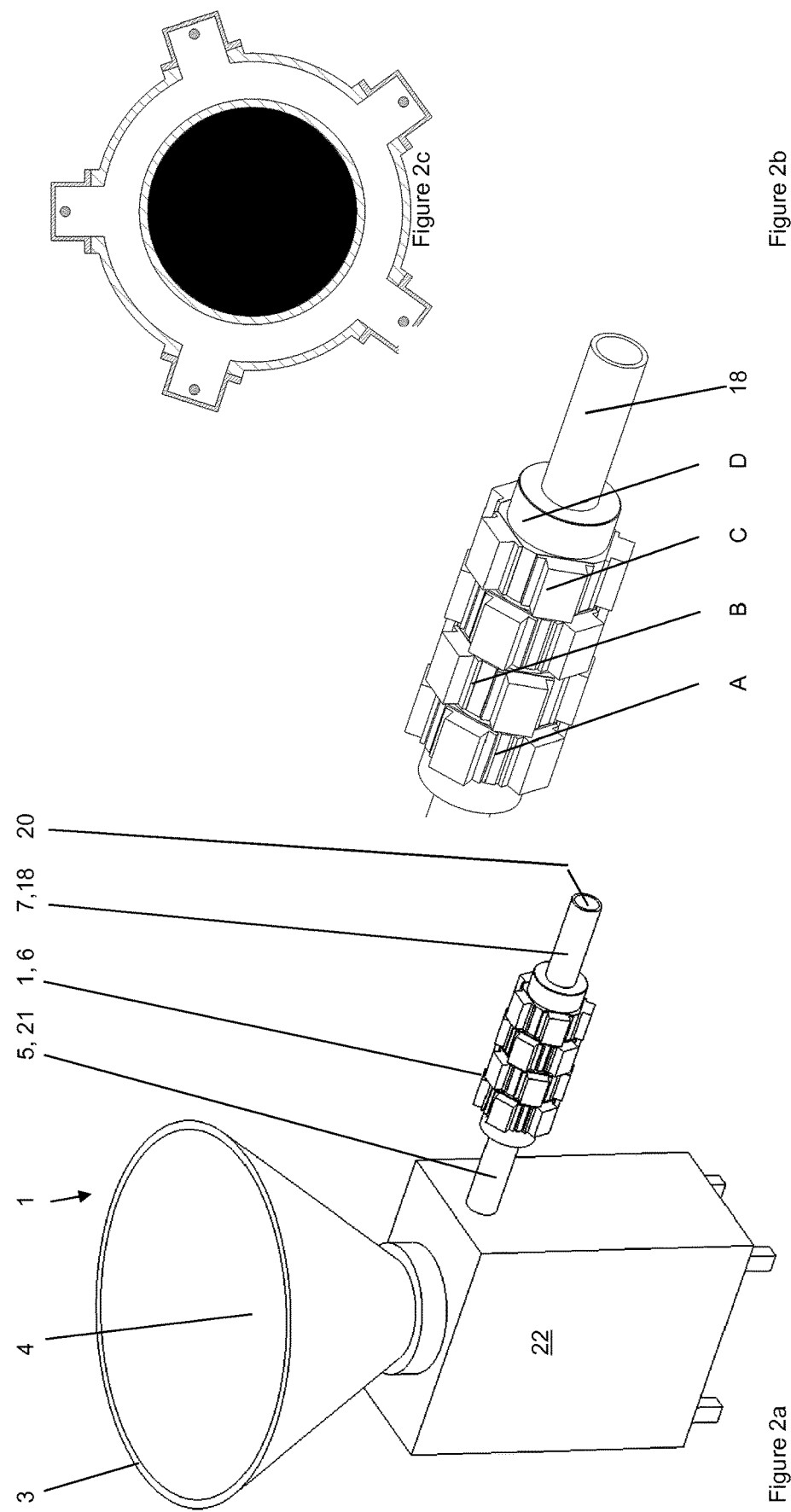

APPARATUS AND METHOD TO TREAT DAIRY PRODUCTS

The present invention relates to a processing apparatus, in which a dairy product is heated, dried, disinfected and/or pasteurized, sterilized. The present invention further relates to a method to treat a dairy product with radio-frequency waves.

Treating products by passing microwave radiation through the products is common as well as in domestic as in industrial applications. A conventional microwave oven for instance comprises a magnetron which produces the microwave energy. However, in industrial applications wherein microwaves are generated by a magnetron the long operating times will result in undesirable heat development and/or the process is not sufficiently controllable. Additionally, undesired hot spots may occur It is therefore the objective of the present invention to provide a processing apparatus and a method that do not comprise the deficiencies according to the state in the art.

The problem is attained with a processing apparatus, in which a dairy product is pumped by a pump through a microwave chamber and thereby heated, dried, disinfected, pasteurized and/or sterilized, wherein the apparatus comprises at least one, preferably a multitude, solid-state radio frequency source(s).

The disclosure made regarding this subject matter of the present invention also applies to the other invention and vice versa. Subject matters disclosed regarding this invention can also be combined with subject matters from other inventions of the present application.

The present invention relates to a processing apparatus with a solid-state radio frequency (RF)-transistor(s) in a RF power amplifier. A radio frequency power amplifier is an electronic amplifier, that converts a low power radio frequency signal into a higher power signal.

Typically, RF-power amplifiers drive the antenna of a transmitter. The antenna can be coupled to and/or located in a waveguide, wherein the antenna can radiate the microwaves into the waveguide which preferably is designed of reflective material and can guide the microwaves to a desired location, for example into the product chamber wherein the products to be treated are located. Compared to a magnetron, an advantages of a solid-state RF energy technology is a low voltage drive, semiconductor reliability and lower energy consumption due to the advanced control system. The inventive apparatus is used to heat, dry, disinfect, pasteurize and/or sterilize a dairy product. A dairy product according to the present invention is a product made from milk, whey or a combination thereof.

Dairy products, according to the present invention, are produced from or containing the milk of mammals, for example cattle, water buffaloes, goats, sheeP and/or camels. Typical dairy products are quark, yogurt, cheese, butter.

The inventive processing apparatus comprises a pump which transports the dairy product past the solid-state radio frequency source(s). The pump can also be means, which add a certain potential energy to the dairy product, so that it can driven by gravitational force past the solid-state radio frequency source(s).

Preferably, the dairy product will be exposed to the microwave energy in a microwave chamber, which is according to a preferred embodiment a tube. The microwave chamber, preferably the pipe, is preferably made from a material which is at least essentially transparent for microwaves and is hence not or only little heated by the microwave energy.

Preferably, the inner area of the pipe is 0,017-0,2 m$^2$ and/or the inner diameter of the pipe is preferably between 0,15 and 0,5 m. Preferably, the microwave chamber comprises a mixing device. In case of a tube, the mixing device is preferably a static mixer.

According to a preferred embodiment of the present invention, the inventive apparatus may not only comprise one but a multitude of solid-state radio frequency sources. This can be accomplished by using one or more antennas and/or one or more waveguides. Each radio frequency source can be preferably powered individually and each radio frequency source can be preferably controlled, more preferably closed loop controlled, more preferably individually. Preferably, the wavelength, amplitude and/or the direction of the radiation can be controlled.

The solid-state radio frequency sources are preferably provided in an array of n columns and m rows, wherein n is an integer >1 and m is an integer ≥1. Preferably, the solid-state radio frequencies are arranged equidistantly in one row and/or the columns are also arranged equidistantly. In case a multitude of sources, they can be arranged at random.

Preferably, the solid-state radio frequency sources are provided equidistantly around the circumference of product chamber. In this chamber, the edible product to be treated will be placed or it will be transported through this product chamber.

According to a preferred embodiment, the processing apparatus comprises an inlet and an outlet, which are spaced apart from each other relative to the flow direction of the dairy product. The dairy product enters the apparatus, preferably the product chamber, through the inlet, passes through the apparatus/product chamber and then exits the apparatus/product chamber through the exit which is different from the inlet.

Preferably, the inventive processing apparatus comprises means to transport the dairy product past the solid-state radio frequency source(s). These means can be a tube and a pump, which pumps the dairy product through the tube. The tube is in the present case the product chamber. Preferably, the tube is at least partially made from a material, that is at least partially transmittable, preferably transparent for the RF-radiation. The tube can for example be made from a plastic- and/or quartz-material, preferably from a food grade plastic material as long as it is at least partially transparent for microwaves. The pump pumps the dairy product preferably as a continuous or semi-continuous stream past the RF-source(s). The speed at which the product is pumped is preferably adjustable, so that the residence time in the product chamber can be varied.

Alternatively or additionally, the product chamber is suitable for batch processing, e.g. a tank or the like. The product chamber is at least partially made from a material, that is at least partially transmittable, preferably transparent for the RF-radiation. The product chamber can for example be made from a plastic- and/or quartz-material, preferably from a food grade plastic material as long as it is at least partially transparent for microwaves.

Preferably, the processing apparatus comprises a control system to control the solid-state radio frequency sources and/or the pump. The control system preferably comprises one or more sensors, whose signal(s) is used to control one or more solid-state radio frequency source(s), preferably individually and/or related to each other and/or the control system controls the pump. In an application pumping the dairy product through a tube, gradually heating of the dairy product can be achieved by controlling the electromagnetic fields by controlling the power level, frequency and/or phase versus time with such precision that, for example, an even energy distribution in the product chamber or in the product will be achieved. The RF-energy load can be adapted to the progress of the treatment process. For instance, during heating the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency and/or the phase can be controlled individually and/or in groups. The antenna may function as a sensor, for example to detect the radiation reflected from the dairy product to be treated.

The sensor can sense one or more properties of the dairy product, for example its temperature and/or the energy absorbed by the dairy product. One sensor can measure what kind of radiation is reflected from the dairy product, for example the wavelength. Since the dairy product is transported during its treatment with the RF-radiation, there can be multiple sensors along the transportation path. The local reading of the sensors can be used to control the corresponding local solid-state radio frequency source(s) and/or the solid-state radio frequency source(s) upstream and/or downstream from the respective sensor. In a preferred embodiment, the sensor is a thermocouple, for example a PT100.

Alternatively or additionally, the pump can be controlled, for example based on the signal of the sensor and the capacity of the pump can be increased or decreased to alter the residence time in the microwave chamber, particularly the tube.

The inventive processing apparatus is preferably part of a feed- or food production line, which comprises one or more treatment stations.

Another preferred or inventive embodiment of the present invention is therefore a production line, particularly a food production line comprising the inventive apparatus.

According to another preferred embodiment, the inventive apparatus is provided together with a cooling unit and/or a packaging unit.

The problem is also solved with a method to treat a dairy product with radio-frequency waves, wherein the radio-frequency waves are provided with one or more solid-state radio frequency source(s).

The disclosure made regarding this subject matter of the present invention also applies to the other invention and vice versa. Subject matters disclosed regarding this invention can also be combined with subject matters from other inventions of the present application.

Preferably the dairy product is transported from an inlet of a treatment apparatus to an exit of the same apparatus which are spaced apart.

Preferably one or more sensors are provided which measure one or more properties of the edible product and/or the radiation reflected from the product. The product-properties are preferably measured at least twice during its treatment with RF-radiation. The changes of the properties are determined and can be taken into account when controlling the solid-state radio frequency source(s) and/or a pump which pumps the dairy product through a microwave chamber, preferably a tube.

The dairy product is heated, dried, disinfected and/or pasteurized, sterilized.

Transistor technology generates powerful RF fields. Preferably multiple RF sources will be applied, the sources can be controlled individually and preferably related to each other. For instance, in an application pumping a mass through a tube, gradually heating of the dairy product can be achieved by controlling the electromagnetic fields by controlling the power level, frequency and phase versus time with such precision that an even energy distribution will be achieved. In general, in case of a change in load in a certain spot of the product, mass, product flow or mass flow, the controller can control the specific parameters parameter in that certain spot in order to correct the adverse effects of the load change. For instance, during heating the load will change constantly, this change in load will be detected via the antenna by measuring the reflected energy. The control system will compare the transmitted energy via the antenna with the reflected energy and will consequently adjust the energy to be transmitted by the antenna. For instance, if no load is present within the product chamber, no energy will be absorbed, the antenna receives the reflected energy and the control unit will stop transmitting new energy to the product chamber. With solid-state RF energy sources, the amplitude, the frequency and the phase can be controlled for each and every antenna. Such an advanced energy management system based on a fast response to the heat demand in certain spots of the product(s) to be heated prevents damaging of internal component and prevents an uncontrolled product treatment with uneven energy distribution.

Due to the efficient use of energy resulting in less energy loss an additional advantage of solid-state RF energy sources is an increase in yield of products to be treated The inventions are now explained according to the Figures. The explanations apply for all embodiments of the present invention likewise.

FIGS. 1a and 1b show a first embodiment of the present invention.

FIGS. 2a-2c show a second embodiment of the present invention.

A first embodiment of a solid-state RF energized microwave apparatus is depicted in FIG. 1a, which comprises a multiple solid-state RF sources 2 which among other things each comprises a waveguide 16 and/or an antenna 17. In the present case, the inventive apparatus comprises a multitude of solid-state RF sources 2, which are provided at the circumference of a product chamber 14 and preferably, equidistantly around the circumference of the of the product chamber. The number of sources 2 in circumferential direction can depend on the efficiency, of the microwaves to heat up product 11 evenly, measured for example the temperature rise per unit of time. The solid-state RF sources 2 are located in a chamber 15, in the present case defined by housing 8. The housing 8 can be similar to a Faraday cage to prevent electromagnetic waves coming out of the housing. At least inner wall 9 but preferably the entire housing 8 can be made of steel, for instance stainless steel. Inside the chamber 15 and/or inside the housing 8, a product chamber 14, here a microwave tube 12 is provided, which separates the product chamber 14 from the chamber 15, in which the solid-state RF sources 2 are located. The tube material is preferably at least partially, more preferably completely transparent for the microwave energy supplied by the solid-state RF sources 2 and more preferably do not absorb microwave energy and will therefore not be heated up by the microwave energy but, if any, only heated up by the warmed-up product without the build-up of deposit on the inner wall of the tube. To effectively convert the microwave energy into increased temperature of the dairy product to be heated, the material of the tube 12 is not metal, but certain plastic materials and/or quartz-materials are suitable, which are more preferably food grade. The dairy product 11 is located within the product chamber 14 and will be treated, preferably heated by one preferably multiple solid-state sources 2 located in chamber 15. This embodiment is, for example, preferred in case cleaning agents used to clean product chamber 14 may not be come in contact with the solid-state sources 2. The tube 12 can also be used to direct the product past the solid-state RF sources 2. In this case, the product touches the inner circumference of tube at least locally. If needed, the chamber 15, which surrounds the tube 12 may be cooled to cool the RF-sources.

FIGS. 2a-2c depicts a first application of the solid-state RF energized microwave apparatus in a line. A mass supply system 3, here a hopper or a pipe, for example comprising a positive displacement pump 2 which forces the dairy product 4, preferably through a supply section 5, to a microwave section part 6 of the inventive apparatus 1 and from there the heated mass 4 is discharged via discharge section 7. The dairy product can be transported continuously or intermittently. The flow can be controlled depending on the residence time needed to achieve a certain temperature rise in the dairy product. The tube via which the food mass is pumped may comprise means to mix the product, for example a static- and/or dynamic mixers. There may be a or multiple sensor(s) provided to measure, for example, the temperature rise. FIG. 2b depicts the arrangement of the solid-state RF heat sources 2, here in four rows A, B, C and D. Each row comprises a multitude of, preferably equidistantly, arranged solid-state radio frequency sources, wherein here, the rows are staggered relative to each other. A cross-sectional view of row B of the microwave section 6 is depicted in FIG. 2c and can be similar as depicted in the embodiment according to FIG. 1a. In order to further optimize the heat distribution to the mass flow and to prevent both "cold-spots" and "hot-spots", the number of cylindrical solid-state radio frequency source arrangements, here rings, can be increased in number, from here four to >four.

For all embodiments above the design of housing 8 is not limited to a circular design as depicted in FIG. 1a but can be shaped differently as depicted in FIG. 1b. Important is that heat treatment of product 11 or mass 4 will not adversely affected by the bouncing microwaves via inner wall 9 of housing 8.

For all embodiments depicted above the design of microwave tube 12 is not limited to a circular design but can be shaped differently. Especially in case a mass 4 flows through the tube as depicted in FIG. 1a circular design is advantageous with respect to pressure distribution. Preferably inner wall 13 should be provided with smooth walls in order to reduce shear forces on the food mass and to facilitate cleaning. Microwave tube 12 is preferably a fixed part within the depicted assembly and is isolated with respect to housing 8 and solid-state RF energy sources 2 which would be advantageous with respect to hygiene. Cleaning of the microwave tube can be done manually but preferably by an integrated CIP system.

LIST OF REFERENCE SIGNS

1 processing apparatus, industrial processing apparatus
2 solid-state RF energy source
3 mass supply system,
4 dairy product
5 supply section, entrance
6 microwave section, treatment section
7 discharge section
8 housing.
9 inner wall housing 8
10 conveyor means
11 product, food product
12 microwave chamber, microwave tube
13 inner wall microwave tube 12
14 product chamber
15 solid-state source chamber
16 waveguide
17 antenna
18 cooling unit
19 —
20 exit
21 inlet
22 pump
A solid-state RF energy source
B solid-state RF energy source
C solid-state RF energy source
D solid-state RF energy source

The invention claimed is:

1. Processing apparatus comprising:
   a pump;
   a microwave chamber; and at least one solid-state radio frequency source;
   wherein the pump is configured to pump a diary product through the microwave chamber to heat, dry, disinfect, pasteurize, and/or sterilize the dairy product;
   wherein the at least one solid-state radio frequency source comprises one or more antennas and/or one or more waveguides, the at least one solid-state radio frequency source is individually powered;
   wherein the processing apparatus comprises a sensor and a control system, the sensor is configured to measure at least one property of the dairy product and at least one property of radiation reflected from the diary product, and a signal from the sensor is utilized by the control system to control the at least one solid-state radio frequency source; and
   wherein the processing apparatus comprises a chamber that surrounds the microwave chamber, the chamber is arranged between the microwave chamber and the at least one solid-state radio frequency source so that the at least one solid-state radio frequency source is free from contacting a wall of the microwave chamber, and wherein the chamber is cooled by a cooling unit that is configured to cool the at least one radio frequency source.

2. Processing apparatus according to claim 1, wherein the microwave chamber does not absorb microwave energy that is supplied by the at least one solid-state radio frequency source.

3. Processing apparatus according to claim 1, wherein the at least one solid-state radio frequency source comprises a multitude of solid-state radio frequency sources that are provided in an array of n columns and m rows, wherein n is an integer >1 and m is an integer ≥1.

4. Processing apparatus according to claim 1, wherein the at least one solid-state radio frequency source comprises a multitude of solid-state radio frequency sources that are provided equidistantly around a circumference of a product chamber.

5. Processing apparatus according to claim 1, wherein the processing apparatus comprises an inlet and an outlet, which are spaced apart from each other and/or wherein the pump transports the dairy product past the at least one solid-state radio frequency source.

6. Processing apparatus according to claim 1, wherein the processing apparatus is part of a dairy product production line.

7. Processing apparatus according to claim 1, wherein the processing apparatus comprises:
a plurality of solid-state radio frequency sources; and
a plurality of chambers disposed around a circumference of the microwave chamber, one or more of which contains one or more of the plurality of the solid-state radio frequency sources.

8. Processing apparatus according to claim 7, wherein the processing apparatus comprises a microwave tube that is disposed around a circumference of the microwave chamber, the microwave tube separates the microwave chamber from one or more of the plurality of chambers, and the dairy product is in contact with an inner circumference of the microwave tube in at least some areas of the microwave tube.

9. Processing apparatus according to claim 8, wherein a material of the microwave chamber does not absorb microwave energy supplied by at least one of the plurality of solid-state radio frequency sources.

10. Processing apparatus according to claim 9, wherein the plurality of openings are spaced about 72 degrees apart or are spaced about 90 degrees apart.

11. Processing apparatus according to claim 7, wherein the processing apparatus comprises a housing in which the microwave chamber is located, the housing comprises a plurality of openings, one or more of which lead to one or more of the chambers, and the processing apparatus comprises at least one waveguide covering at least one of the plurality of openings and configured to direct RF-radiation.

12. Processing apparatus according to claim 1, wherein the at least one solid-state radio frequency source comprises a plurality of solid-state radio frequency sources, the plurality of solid-state radio frequency sources are arranged in a plurality of circumferential rings extending around a longitudinal axis, wherein the plurality of solid-state radio frequency sources in one of the circumferential rings are rotationally staggered about the longitudinal axis relative to the plurality of solid-state radio frequency sources in an adjacent one of the circumferential rings.

13. Processing apparatus, in which a dairy product is pumped by a pump through a microwave chamber and thereby heated, dried, disinfected, pasteurized and/or sterilized,
wherein the processing apparatus comprises at least one solid-state radio frequency source that is configured to generate microwave energy; at least one sensor; and a control system;
wherein the at least one solid-state radio frequency source is configured to generate and transmit the microwave energy to the dairy product, the at least one sensor is configured to measure the microwave energy that is reflected from the dairy product, and the control system is configured to compare the transmitted microwave energy to the reflected microwave energy and then, based on the comparison, the control system is configured to adjust any additional microwave energy that is transmitted by the at least one solid-state radio frequency source; and
wherein the processing apparatus comprises a chamber that surrounds the microwave chamber, the chamber is arranged in between the microwave chamber and the at least one solid-state radio frequency source so that the at least one solid-state radio frequency source is spaced apart from and free from contacting a wall of the microwave chamber.

14. Processing apparatus according to claim 13, wherein the pump is controlled based on a signal from the at least one sensor, and a capacity of the pump is increased or decreased to alter a residence time of the dairy product in the microwave chamber.

15. Processing apparatus according to claim 13, wherein the control system is configured to stop transmission of the microwave energy from the at least one solid-state radio frequency source when no microwave energy is absorbed in the microwave chamber.

16. Processing apparatus according to claim 13, wherein the at least one solid-state radio frequency source comprises a plurality of solid-state radio frequency sources, the plurality of solid-state radio frequency sources are arranged in a plurality of circumferential rings extending around a longitudinal axis, wherein the plurality of solid-state radio frequency sources in one of the circumferential rings is rotationally staggered about the longitudinal axis relative to the plurality of solid-state radio frequency sources in an adjacent one of the circumferential rings.

17. Processing apparatus according to 22, wherein the at least one solid-state radio frequency source comprises a plurality of solid-state radio frequency sources, wherein the processing apparatus comprises a housing in which the microwave chamber is located, the housing comprises a plurality of openings defined around its circumference, one or more of the openings lead to one of the chambers in which one or more of the plurality of solid-state radio frequency sources is located, and the processing apparatus comprises at least one waveguide for covering at least one of the openings.

18. A processing apparatus comprising:
a microwave chamber;
a pump configured to pump a diary product through the microwave chamber to heat, dry, disinfect, pasteurize, and/or sterilize the dairy product;
a plurality of chambers disposed around the circumference of the microwave chamber, one or more of which contain one or a plurality of solid-state radio frequency sources;
a microwave tube disposed around the circumference of the microwave chamber, that separates the microwave chamber from the plurality of chambers;
a housing in which the microwave chamber is located, the housing comprises a plurality of openings defined around its circumference, each of the plurality of openings lead to one of the plurality of chambers in which one of the plurality of solid-state radio frequency sources are located,;
a waveguide covering one or more of the plurality of openings and configured to direct RF-radiation in a direction of the dairy product; and
wherein the processing apparatus comprises a chamber that surrounds the microwave chamber, the chamber is arranged in between the microwave chamber and the plurality of chambers so that the one or the plurality of solid-state radio frequency sources are spaced apart from and free from contacting a wall of the microwave chamber, and wherein the chamber that surrounds the microwave chamber is cooled by a cooling unit to cool the one or the plurality of solid-state radio frequency sources.

19. Processing apparatus according to claim 18, wherein the at least one solid-state radio frequency source comprises a plurality of solid-state radio frequency sources, the plurality of solid-state radio frequency sources are arranged in a plurality of circumferential rings extending around a longitudinal axis, wherein the plurality of solid-state radio frequency sources in one of the plurality of circumferential rings are rotationally staggered about the longitudinal axis relative to the plurality of solid-state radio frequency sources in an adjacent one of the circumferential rings.

20. Processing apparatus according to claim 19, wherein the at least one solid-state radio frequency source is configured to generate and transmit the microwave energy to the dairy product, the at least one sensor is configured to measure the microwave energy that is reflected from the dairy product, and the control system is configured to compare the transmitted microwave energy to the reflected microwave energy and then, based on the comparison, the control system is configured to adjust any additional microwave energy that is transmitted by the at least one solid-state radio frequency source.

\* \* \* \* \*